(12) United States Patent
Wittig

(10) Patent No.: US 9,527,550 B1
(45) Date of Patent: Dec. 27, 2016

(54) METHOD AND APPARATUS FOR LOW DRAG WATERCRAFT

(71) Applicant: Michael Wittig, Santa Clara, CA (US)

(72) Inventor: Michael Wittig, Santa Clara, CA (US)

( * ) Notice: Subject to any disclaimer, the term of this patent is extended or adjusted under 35 U.S.C. 154(b) by 0 days.

(21) Appl. No.: 14/083,430

(22) Filed: Nov. 18, 2013

(51) Int. Cl.
  *B63B 1/34* (2006.01)
  *B63B 1/36* (2006.01)

(52) U.S. Cl.
  CPC .. *B63B 1/36* (2013.01); *B63B 1/34* (2013.01)

(58) Field of Classification Search
  CPC .............. B63B 1/00; B63B 1/34; B63B 1/36; B63B 1/38; B63B 1/22; B63B 1/28; B63B 1/32

USPC ............................................... 114/284, 67 R
  See application file for complete search history.

(56) References Cited

U.S. PATENT DOCUMENTS

| | | | | |
|---|---|---|---|---|
| 532,221 | A * | 1/1895 | Thomas | B63B 1/38 |
| | | | | 114/67 R |
| 3,621,803 | A * | 11/1971 | Foster | B63B 1/36 |
| | | | | 114/67 R |
| 6,116,176 | A * | 9/2000 | Jones | B63B 1/36 |
| | | | | 114/67 R |
| 2002/0117097 | A1* | 8/2002 | Dong | B63B 1/36 |
| | | | | 114/67 R |

* cited by examiner

*Primary Examiner* — Lars A Olson

(57) ABSTRACT

In one embodiment of the invention, a watercraft has belts along its outer surfaces.

6 Claims, 7 Drawing Sheets

METHOD AND APPARATUS FOR LOW DRAG WATERCRAFT

This application claims the benefit of U.S. Provisional Application No. 61/727,704, filed on Nov. 17, 2012, the entire disclosure of which is hereby incorporated by reference herein.

BACKGROUND

The invention relates generally to watercraft, and more particularly to watercraft incorporating drag-reducing features.

Drag is a critical aspect of the design of watercraft. Designers are constantly striving to reduce drag not only to improve efficiency, but also to allow watercraft to reach greater speeds.

There are five major sources of drag acting on a watercraft: form drag, interference drag, skin friction, wave drag, and induced drag. Form drag results from the vehicle's shape as well as the cross-sectional area of the vehicle. Interference drag results from vortex shedding. Skin friction results from the friction of the water rubbing against the skin of the vehicle. Wave drag results from the energy carried away from the vehicle by waves as it moves through the water. Finally, induced drag results from redirecting the flow of fluid. This kind of drag results from items such wings as they generate lift.

A technique to reduce watercraft drag is to minimize the surface area of the watercraft in contact with the water. A boat employing a hydrofoil to lift its hull out of the water is one example of a watercraft employing this technique. Disadvantageously, however, the weight of the boat must be lifted out of the water, resulting in induced drag at the hydrofoil as it deflects water downward to provide the necessary lift.

A technique commonly used to achieve greater speed is called "planing." To achieve planing, a boat typically has a broad, relatively flat hull toward its rear. As greater and greater power is applied, the front of the boat lifts and oncoming water is directed downward by the flat section of the hull. The boat gradually shifts from being supported mainly by buoyant forces to being mainly supported by hydrodynamic lift forces. Disadvantageously, however, planing is typically inefficient and requires a lot of power.

There exists a need for a way of reducing drag that would enable watercraft to achieve high efficiencies and greater speeds.

SUMMARY

The need described above is addressed, in one embodiment of the invention, by a watercraft having the majority of the surfaces in contact with the water be moving surfaces that move with substantially the same speed and in the opposite direction as the watercraft as it moves through the water. The self-propelled watercraft includes a hull having first and second rotatable rollers, a belt mounted between the first and second rotatable rollers, a motor connected to the first roller for rotating the first roller, a sensor for determining the speed of the watercraft through the water, a sensor for determining the surface speed of the belt, and a controller connected to the motor for adjusting the surface speed of the belt to match the speed of the watercraft through the water.

DRAWINGS

DETAILED DESCRIPTION

Figure 1:
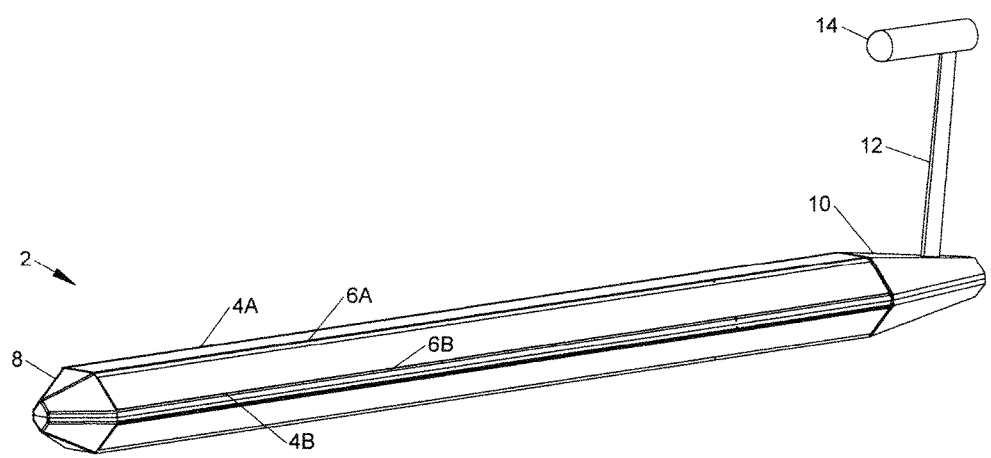
FIG. 1 is a perspective view an exemplary embodiment.
Figure 2:
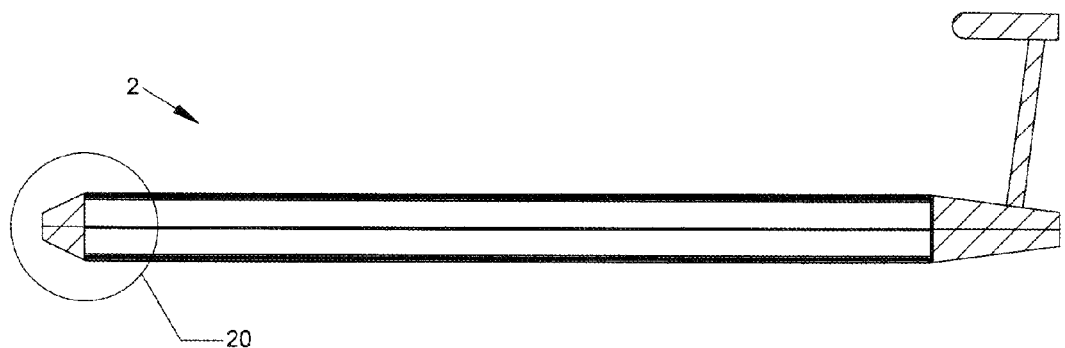
FIG. 2 is a schematic cross-sectional side view of the embodiment of FIG. 1.
Figure 3:
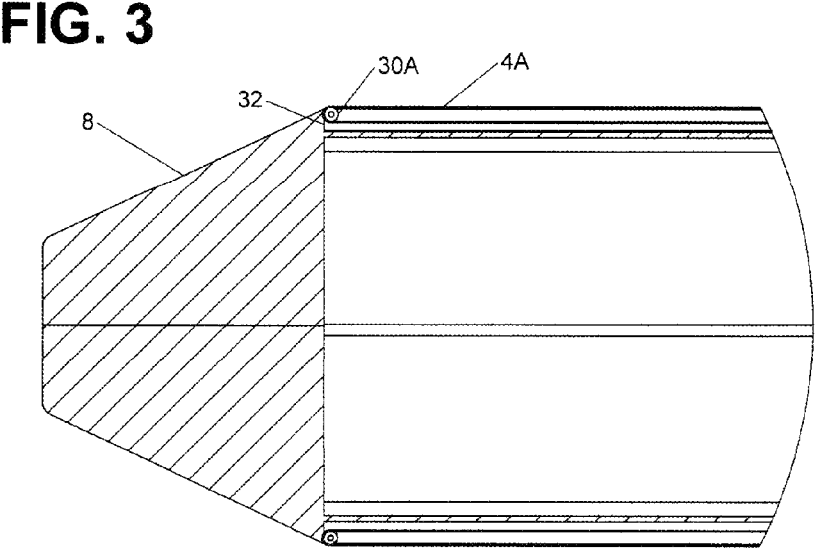
FIG. 3 is a close-up view of area 20 of the cross-sectional side view of FIG. 2.

FIG. 1 is a perspective view of a first exemplary embodiment. A watercraft 2 comprises a nose 8 and six moving surfaces including moving surfaces 4A and 4B. A frame is comprised of six frame elements including frame elements 6A and 6B that separate the moving surfaces. In the embodiment shown in FIG. 1, the moving surfaces take the form of belts that are arranged lengthwise around the outer surface of watercraft 2. A tail 10 completes the body of the watercraft. A tower 12 extends from tail 10 in this embodiment, with a pod 14 mounted on the tower. FIG. 2 shows a cross-section of the embodiment shown in FIG. 1. A detailed view of the front of moving surface 4A is shown in FIG. 3. In this embodiment, moving surface 4A is a belt that rides on roller 30A and a second identical roller at the rear of the watercraft just in front of the tail 10.

Figure 4:
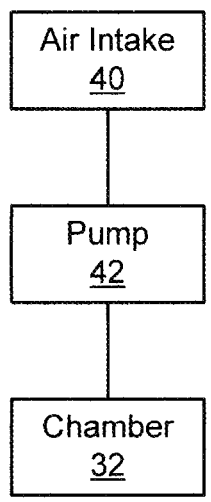
FIG. 4 is a schematic diagram illustrating a pressurization aspect of the embodiment of FIGS. 1-3.

Pod 14 includes an air intake 40, shown schematically in FIG. 4, which is mounted at the top of pod 14 and allows for air to be taken into the watercraft. In one preferred embodiment, a pump 42 draws air into air intake 40 and blows it into a chamber 32, where belt 4A and roller 30A are installed. The air pressure is used to counteract the pressure of the water surrounding watercraft 2 that is pressing on belt 4A. The leakage of the air in chamber 32 around belt 4A helps prevent water from leaking into chamber 32. Water may also be sealed out via the sealing system shown in FIG. 9, which is discussed in further detail below.

Figure 5:
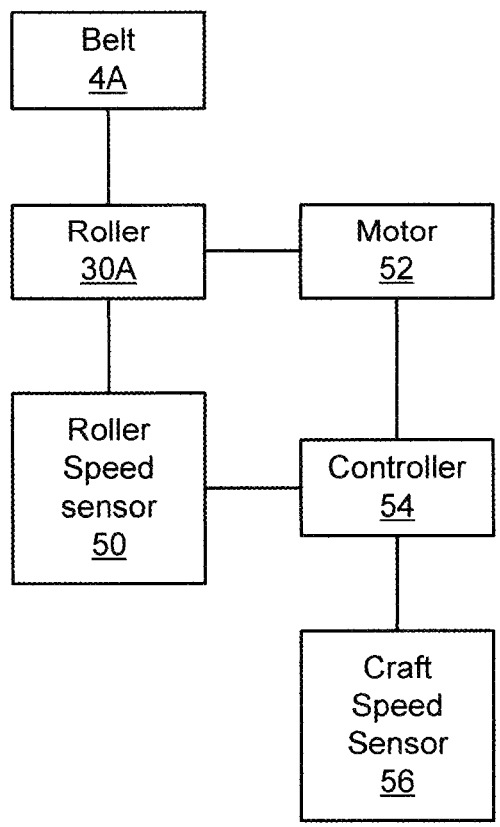
FIG. 5 is a schematic diagram illustrating a speed control aspect of the embodiment of FIGS. 1-3.

FIG. 5 shows additional aspects of the system. Belt 4A, which rides on roller 30A, is driven by a motor 52, which in turn is powered by a controller 54. Controller 54 receives a signal representing the speed of rotation of roller 30A from roller speed sensor 50. Watercraft 2 also includes a craft speed sensor 56 which provides controller 54 with a signal representing the speed of watercraft 2 through the water. In the embodiment of FIG. 1., craft speed sensor 56 is a conventional watercraft speed sensor as is well known in the art, although in some alternative embodiments craft speed sensor 56 can take the form of a more exotic sensor for sensing the speed of watercraft 2, such as a global positioning system or GPS sensor.

In operation, watercraft 2 operates submerged, with only part of tower 12 and pod 14 extending out of the water. This helps to reduce some forms of drag on watercraft 2, such as wave drag. As watercraft 2 moves through the water via a propulsion system, such as a propeller attached to tail 12, the six belts running along the length of watercraft 2, including belts 4A and 4B, run such that their outer surfaces move continuously from nose 8 to tail 10. Preferably, controller 54 senses the speed of watercraft 2 via craft speed sensor 56 and has the outer surfaces of the belts move at substantially the same speed as the speed that watercraft 2 moves forward through the water. In this way, skin drag from the water surrounding the craft is reduced. To further reduce drag, the body of watercraft 2 is preferably long and narrow, with a length to width ratio of its body being at least 15:1, more preferably 20:1.

Figure 6:
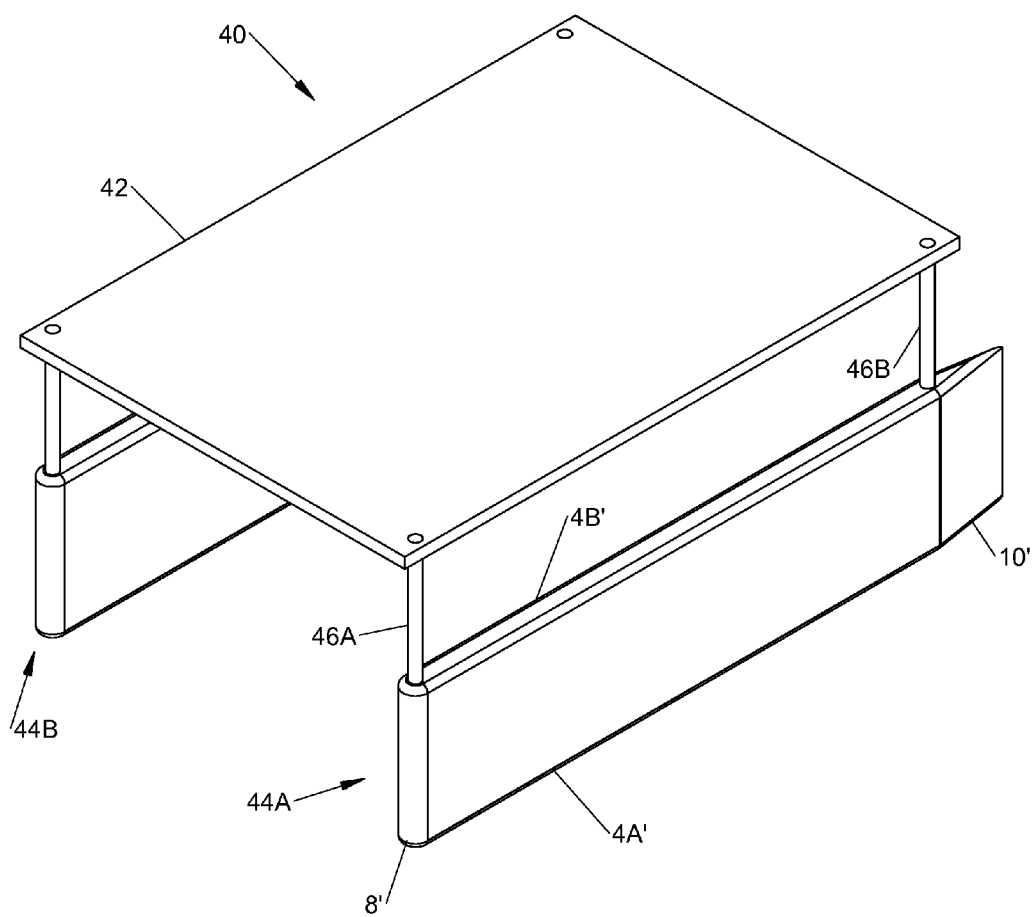
FIG. 6 is a perspective view of a second exemplary embodiment.
Figure 7:
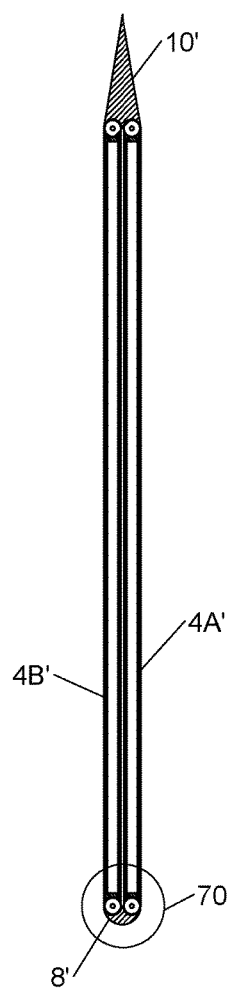
FIG. 7 is a cross-sectional top view of one pontoon of the embodiment of FIG. 6.
Figure 8:
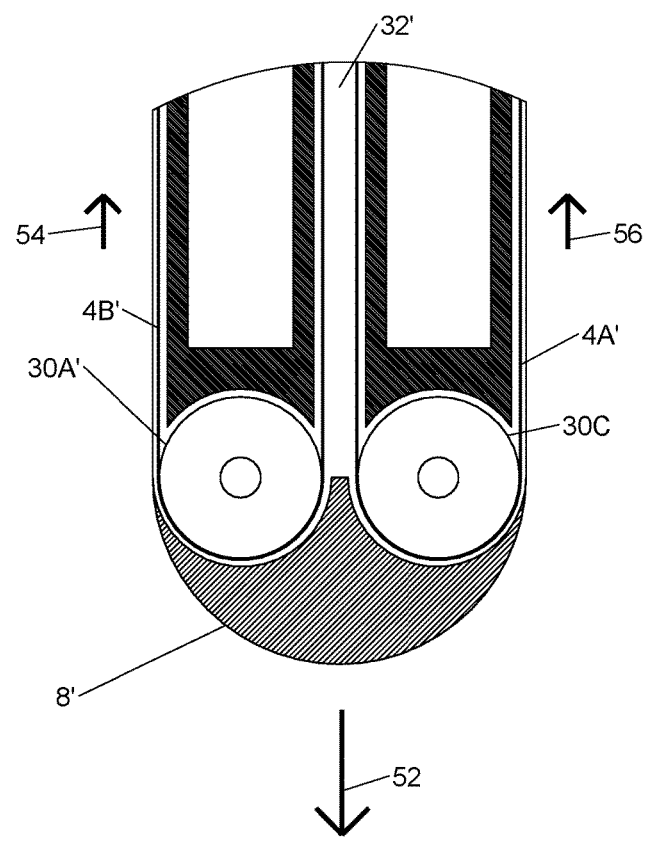
FIG. 8 is a close-up view of area 70 of the cross-sectional top view of FIG. 7.

A second exemplary embodiment is shown in FIG. 6. A watercraft 40 is comprised of a hull 42 which is supported by pontoons 44A and 44B. Pontoon 44A comprises supports 46A and 46B, a nose 8', moving surfaces 4A' and 4B', and a tail 10'. In this embodiment, moving surfaces 4A' and 4B' are belts running between rollers along the length of pontoon 44A. As shown in FIG. 7, belts 4A' and 4B' run the length of pontoon 44A. FIG. 8 shows a close-up view of the front portion of pontoon 44A. Belt 4B' rides on roller 30A' and a second roller at the rear of pontoon 44A near tail 10'. Belt 4A' rides on a roller 30C and a second roller at the rear of pontoon 44A near tail 10'. Arrows 54 and 56 denote the movement of the outer surfaces of belts 4B' and 4A' respectively and arrow 52 denotes the movement of watercraft 40. Belt 4A' is driven by the system shown in FIG. 5, with belt 4A replaced with belt 4A'. Similarly, belt 4B' is driven by the system shown in FIG. 5, with belt 4A replaced with belt 4B'. In operation, the outer surfaces of belts 4B' and 4A' move at substantially the same speed backwards (in the direction of arrows 54 and 56) that watercraft 40 moves through the water forward (which is in the direction of arrow 52). Pontoon 44B is constructed substantially identically and operates substantially identically as pontoon 44A.

Figure 9:
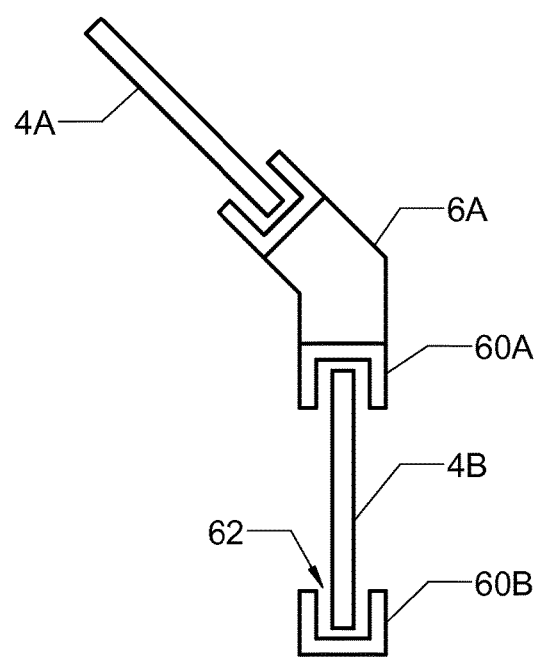
FIG. 9 is a cross-sectional view of one exemplary embodiment for sealing belt 4B.

FIG. 9 is a cross-sectional view of the outward-facing surface of belt 4B in the embodiment of FIG. 1, illustrating one exemplary embodiment for sealing watercraft 2 at belt 4B to reduce or eliminate the leakage of water into watercraft 2. One edge of belt 4B is sealed with a seal 60A, while the other edge is sealed with a substantially identical seal 60B. As shown for seal 60B, a gap 62 is formed between belt 4B and a parallel surface of seal 60B. Gap 62 is sized such that it isn't too small to cause undue rubbing between seal 60B and belt 4B, yet it isn't too large to allow excessive leakage of water into watercraft 2. Preferably, it is sized such that a thin layer of water is maintained between the surface of 60B and belt 4B, similar to the layer of lubricant in a so-called fluid "dynamic bearing" or "hydrostatic bearing". In this manner, belt 4B is supported by the fluid layer and prevented from excessively colliding with the surfaces of seal 60B, and excessive water is also prevented from leaking into watercraft 2.

Figure 10:
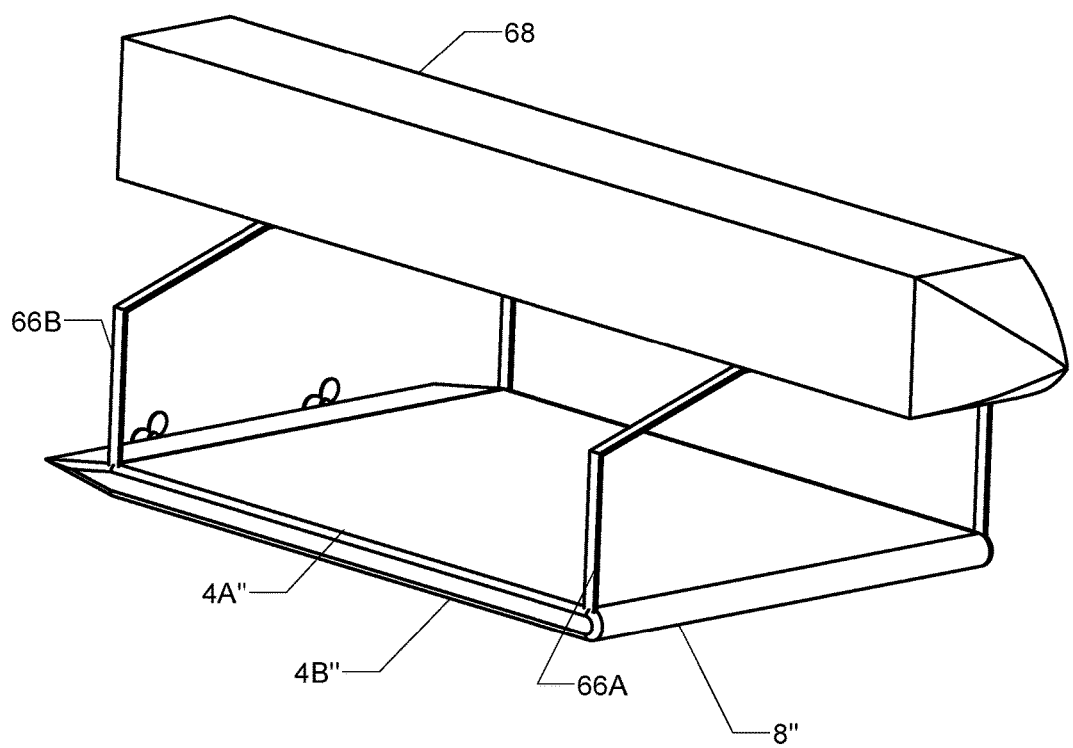
FIG. 10 is a perspective view of an exemplary embodiment similar to the embodiment of FIG. 6, except that a larger horizontal pontoon replaces vertical pontoons.

FIG. 10 is an isometric view of another embodiment similar to the embodiment of FIG. 6, except that a larger horizontal pontoon replaces vertical pontoons. Belts 4A" and 4B" run on the top and bottom surfaces of the horizontal pontoon, which is supported by legs 66A and 66B. Legs 66A and 66B are streamline and result in minimum drag. While the horizontal pontoon is completely submerged, a hull 68 is completely out of the water to prevent it from creating significant drag.

While the invention is described in this disclosure by way of example embodiments and drawings of these example embodiments, those skilled in the art will recognize that the invention is not limited to the example embodiments described in the description or shown in the drawings; instead, the full scope of the invention is defined by the appended claims. The headings used in this disclosure are for organizational purposes only and are not meant to limit the scope of the invention in any way. Additionally, the word "may" is used in a permissive sense (i.e., meaning having the potential to), rather than the mandatory sense (i.e., meaning must). Similarly, the words "include", "including", and "includes" mean including, but not limited to.

The invention claimed is:

1. A self-propelled watercraft comprising:
 a hull having first and second rotatable rollers;
 a belt mounted between the first and second rotatable rollers;
 a motor connected to the first roller for rotating the first roller;
 a sensor for determining the speed of the watercraft through the water;
 a sensor for determining the surface speed of the belt; and
 a controller connected to the motor for adjusting the surface speed of the belt to match the speed of the watercraft through the water.

2. The self-propelled watercraft of claim 1, wherein the sensor for determining the surface speed of the belt signals the speed of rotation of the first roller.

3. The self-propelled watercraft of claim 1, wherein the sensor for determining the speed of the watercraft is a global positioning system sensor.

4. The self-propelled watercraft of claim 1, wherein the hull is configured to be submerged under water.

5. The self-propelled watercraft of claim 1, wherein the hull further comprises a pontoon, and said first and second rotatable rollers are mounted to the pontoon.

6. The self-propelled watercraft of claim 1, further comprising a chamber around said first and second rotatable rollers and an air pump for pumping air into the chamber.

* * * * *